(12) United States Patent
Dams et al.

(10) Patent No.: US 6,613,860 B1
(45) Date of Patent: Sep. 2, 2003

(54) COMPOSITIONS COMPRISING FLUORINATED POLYETHER SILANES FOR RENDERING SUBSTRATES OIL AND WATER REPELLENT

(75) Inventors: Rudolf J. Dams, Antwerp (BE); Franceska M. Fieuws, Destelbergen (BE); Steven J. Martin, Shoreview, MN (US); Michael S. Terrazas, Prescott, WI (US); Mark J. Pellerite, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/689,013

(22) Filed: Oct. 12, 2000

(51) Int. Cl.$^7$ ................................................ C08G 77/60
(52) U.S. Cl. ............................. 528/36; 528/35; 528/42; 528/401; 427/387; 427/393.4
(58) Field of Search .................. 528/42, 401, 284, 528/35, 36; 427/387, 393.4; 106/287.1

(56) References Cited

U.S. PATENT DOCUMENTS

| | | | |
|---|---|---|---|
| 3,646,085 A | 2/1972 | Bartlett | |
| 3,646,805 A | 3/1972 | Walters | |
| 3,810,874 A | 5/1974 | Mitsch et al. | |
| 3,810,876 A | 5/1974 | Cowell et al. | |
| 3,950,588 A | 4/1976 | McDougal | |
| 4,085,137 A | 4/1978 | Mitsch et al. | |
| 5,274,159 A | 12/1993 | Pellerite et al. | |
| 5,276,159 A | 1/1994 | Smith et al. | |
| 5,306,758 A | 4/1994 | Pellerite | |
| 5,602,225 A | * 2/1997 | Montagna et al. | |
| 5,919,866 A | 7/1999 | Rao et al. | |
| 5,972,517 A | * 10/1999 | Kondo et al. | |
| 6,020,450 A | * 2/2000 | Matsuda et al. | |
| 6,183,872 B1 | * 2/2001 | Tanaka et al. | 106/287.13 |
| 6,218,499 B1 | * 4/2001 | Tarumi et al. | |
| 6,361,870 B1 | * 3/2002 | Steffl et al. | 106/287.12 |

FOREIGN PATENT DOCUMENTS

| | | |
|---|---|---|
| DE | 197 30 245 | 1/1999 |
| EP | 0 433 070 | 6/1991 |
| EP | 0 661 558 A1 | 7/1995 |
| EP | 0 731 125 A1 | 9/1996 |
| EP | 789050 | 8/1997 |
| EP | 0 789 050 A2 | 8/1997 |
| EP | 0 797 111 A2 | 9/1997 |
| EP | 0 933 377 | 8/1999 |
| EP | 1 006 168 A1 | 6/2000 |
| WO | WO 99/37720 | 7/1999 |

* cited by examiner

*Primary Examiner*—Margaret G. Moore
*Assistant Examiner*—Marc Zimmer

(57) ABSTRACT

The present invention provides composition for treating a substrate comprising a homogeneous mixture of:

(a) a fluorinated polyether silane of the formula:

$$R_f^1-[-Q-SiY_{3-x}R^1_x]_y \quad (I)$$

wherein $R_f^1$ represents a monovalent or divalent polyfluoropolyether group, Q represents an organic divalent linking group, $R^1$ represents a $C_1-C_4$ alkyl group, Y represents a hydrolysable group; x is 0 or 1 and y is 1 or 2;

(b) an organic or an inorganic acid;

(c) water; and (d) an organic solvent. The invention further provides a method of making such a composition and the use thereof to treat substrates to render them oil and water repellent.

13 Claims, No Drawings

COMPOSITIONS COMPRISING FLUORINATED POLYETHER SILANES FOR RENDERING SUBSTRATES OIL AND WATER REPELLENT

FIELD OF THE INVENTION

The present invention relates to a method of treating substrates, in particular substrates having a hard surface such as ceramics, to render them water, oil, stain and dirt repellent. The present invention also relates to compositions for use in such a method.

BACKGROUND OF THE INVENTION

The use of fluorinated silanes, i.e. silane compounds that have one or more fluorinated groups for rendering substrates such as glass and ceramics oil and water repellent have been long known. For example such silanes have been described in U.S. Pat. No. 5,274,159. This latter document describes destructable fluorinated alkoxysilane surfactants that can be applied from an aqueous solution.

Commercial products are also available that comprise a silane having one or more hydrolysable groups and at least one non-hydrolysable fluorinated alkyl group. One such commercially available product is FC 405, available from 3M Company. This product comprises a solution in ethanol of a silane having a non-hydrolysable fluorinated alkyl group. The product is used to treat ceramic or glass surfaces and is generally applied in the presence of an acid such as acetic acid. Although good results are obtained with such products, there continues to be a desire to further improve them, in particular the abrasion resistance.

Fluorinated polyether silanes are also known in the art. For example, EP 789050 discloses the use thereof for making composite film coatings. U.S. Pat. No. 3,646,085 teaches fluorinated polyether silanes for rendering glass or metal surfaces oil and water repellent. The surfaces are rendered oil and/or water repellent by treating them with a solution of the fluorinated polyether silane in ethanol or in 1,2,2-trichloro-1,1,2-trifluoroethane. WO 99/37720 discloses fluorinated polyether silanes for providing an antisoiling coating to antireflective surfaces on substrates such as glass or plastic. It is taught to apply the fluorinated polyether silane from a solution in an aprotic solvent. The necessary amount of water for the condensation reaction is supplied by allowing the treated substrates to cure in an environment of sufficient humidity.

U.S. Pat. No. 3,950,588 discloses the use of fluorinated polyether silanes to render ceramic surfaces such as bathroom tiles or cookware water and/or oil repellent. It is taught in this document that care should be taken that the coating composition is contained in an anhydrous state prior to application. Also, it is recommended in this document that the surface to be treated be free of water as a separate phase. The necessary water for the polycondensation reaction at the surface is derived from adsorbed water in the ceramic and/or the environment.

Although many fluorinated silane compositions are known in the art for treating substrates to render them oil and water repellent, there continues to be a desire to provide further compositions for the treatment of substrates, in particular substrates having a hard surface such as ceramics, in order to render them water and oil repellent. Desirably, such compositions and methods employing them can yield coatings that have improved properties. In particular, it would be desirable to improve the durability of the coating, including an improved abrasion resistance of the coating. The compositions can preferably be applied in an easy, convenient and safe way and are compatible with existing manufacturing methods. Preferably, the compositions will fit easily in the manufacturing processes that are practiced to produce the substrates to be treated. The compositions preferably also avoid the use of ecologically objectionable components.

SUMMARY OF THE INVENTION

The present invention provides in one aspect a composition for treating a substrate comprising a homogeneous mixture of (a) a fluorinated polyether silane of the formula:

$$R_f^1 - [-Q - SiY_{3-x}R^1_x]_y \quad (I)$$

wherein $R_f^1$ represents a monovalent or divalent polyfluoropolyether group, Q represents an organic divalent linking group, $R^1$ represents a $C_1$–$C_4$ alkyl group, Y represents a hydrolysable group; x is 0 or 1 and y is 1 or 2;

(b) an organic or an inorganic acid;

(c) water; and (d) an organic solvent.

It has been found that when a fluorinated polyether silane of formula (I) is applied from a homogeneous mixture that includes an organic or inorganic acid as well as water, oil and water repellent coatings can be obtained that have improved abrasion resistance relative to similar fluorinated polyether silanes that have been applied in accordance with the methods of the prior art that use compositions that do not include water and the acid. Furthermore, the compositions spread well on the substrate to be treated with the result that uniform properties can be achieved over the whole surface of the treated substrate.

By the term 'homogeneous mixture' in connection with the present invention is meant that the composition is stable, i.e. no precipitation or phase separation occurs, for at least the amount of time necessary to prepare the composition and to apply it to the substrate. Generally, this means that the composition should be stable for at least one hour. Compositions of the invention were found to have generally a stability of 1 to 3 days or even longer despite the fact that the compositions contain water as well as an acid catalyst. The compositions suitable for use in this invention may be clear solutions as well as somewhat turbid mixtures.

Advantageously, the compositions of the invention are prepared by diluting a concentrated solution of the fluorinated polyether silane of formula (I). Accordingly, in a further aspect, the invention provides a method for making a composition for the treatment of a substrate, the method comprising diluting a concentrated solution of at least 25% by weight of a fluorinated polyether silane of formula (I) in an organic solvent by adding to said solution an organic solvent, water, and an organic or inorganic acid so as to prepare a homogeneous mixture containing between 0.01 and 5% by weight inclusive of the fluorinated polyether silane.

In a still further aspect, the present invention also provides a method for treating a substrate, comprising the step of applying the composition of the invention as defined above to the substrate. Preferably, the obtained coating on the substrate is cured, generally at an elevated temperature of 40 to 300° C. The heat for curing can be supplied either through an initial preheat of substrates having sufficient heat capacity to provide the heat for curing, or through heating of coated substrates by an external heat source subsequent to coating.

DETAILED DESCRIPTION OF THE INVENTION

The monovalent or divalent polyfluoropolyether group $R_f$ in the above Formula I, representing the fluorinated polyether silane, can include linear, branched, and/or cyclic structures, that may be saturated or unsaturated. It is preferably a perfluorinated group (i.e., all C—H bonds are replaced by C—F bonds). More preferably, it includes perfluorinated repeating units selected from the group of —($C_nF_{2n}$)—, —($C_nF_{2n}O$)—, —(CF(Z))—, —(CF(Z)O)—, —(CF(Z)$C_nF_{2n}O$)—, —($C_nF_{2n}$CF(Z)O)—, —($CF_2CF_2$O)—, and combinations thereof. In these repeating units Z is a perfluoroalkyl group, an oxygen-substituted perfluoroalkyl group, a perfluoroalkoxy group, or an oxygen-substituted perfluoroalkoxy group, all of which can be linear, branched, or cyclic, and preferably have about 1 to about 9 carbon atoms and 0 to about 4 oxygen atoms. Examples of polyfluoropolyethers containing polymeric moieties made of these repeating units are disclosed in U.S. Pat. No. 5,306, 758 (Pellerite). For the monovalent polyfluoropolyether group (wherein y is 1 in Formula I above), the terminal groups can be ($C_nF_{2n+1}$)—, ($C_nF_{2n+1}O$)— or (X'$C_nF_{2n}O$)—, wherein X' is H, Cl, or Br, for example. Preferably, these terminal groups are perfluorinated. In these repeating units or terminal groups, n is 1 or more, and preferably 1 to 4.

Preferred approximate average structures for a divalent perfluoropolyether group include —$CF_2O(CF_2O)_m(C_2F_4O)_pCF_2$—, wherein an average value for m and p is 0 to 50, with the proviso that m and p are not simultaneously 0, —CF($CF_3$)O(CF($CF_3$)$CF_2$O)$_p$CF($CF_3$)—, —$CF_2O(C_2F_4O)_pCF_2$—, and —($CF_2$)$_3$O($C_4F_8$O)$_p$($CF_2$)$_3$—, wherein an average value for p is 1 to 50. Of these, particularly preferred approximate average structures are —$CF_2O(CF_2O)_m(C_2F_4O)_pCF_2$—, —$CF_2O(C_2F_4O)_pCF_2$—, and —CF($CF_3$)O(CF($CF_3$)$CF_2$O)$_p$CF($CF_3$)—. Particularly preferred approximate average structures for a monovalent perfluoropolyether group include $C_3F_7$O(CF($CF_3$)$CF_2$O)$_p$CF($CF_3$)— and $CF_3$O($C_2F_4O)_pCF_2$— wherein an average value for p is 1 to 50. As synthesized, these compounds typically include a mixture of polymers. The approximate average structure is the approximate average of the mixture of polymers.

The divalent linking group Q can include linear, branched, or cyclic structures, that may be saturated or unsaturated. The group Q can contain one or more heteroatoms (e.g., oxygen, nitrogen, or sulfur) or functional groups (e.g., carbonyl, amido, urethanylene or sulfonamido). It can also be substituted with halogen atoms, preferably, fluorine atoms, although this is less desirable, as this might lead to instability of the compound. Preferably, the divalent linking group Q is a hydrocarbon group, preferably, a linear hydrocarbon group, optionally containing heteroatoms or functional groups, and more preferably, containing at least one functional group. Examples of Q groups include —C(O)NH($CH_2$)$_3$—, —$CH_2$O($CH_2$)$_3$—, —C(O)S($CH_2$)$_3$—, —$CH_2$OC(O)N(R)($CH_2$)$_3$—, wherein R is H or lower alkyl group, and —($C_nH_{2n}$)—, wherein n is about 2 to about 6. A preferred linking group Q is —C(O)NH($CH_2$)$_3$— or —$CH_2$O($CH_2$)$_3$—.

Y represents a hydrolyzable group in formula (I) such as for example a halide, a $C_1$–$C_4$ alkoxy group, an acyloxy group or a polyoxyalkylene group, such as polyoxyethylene groups as disclosed in U.S. Pat. No. 5,274,159. Specific examples of hydrolysable groups include methoxy, ethoxy, propoxy, chloro, and acetoxy groups.

Compounds of Formula I suitable for compositions for treating substrates of the present invention have a molecular weight (number average) of at least about 200, and preferably, at least about 1000. Preferably, they are no greater than about 10000.

Examples of preferred fluorinated silanes include, but are not limited to, the following approximate average structures: $XCF_2O(CF_2O)_m(C_2F_4O)_pCF_2X$, $C_3F_7O(CF(CF_3)CF_2O)_pCF(CF_3)X$, $XCF(CF_3)O(CF(CF_3)CF_2O)_pCF(CF_3)X$, $XCF_2O(C_2F_4O)_pCF_2X$, and $CF_3O(C_2F_4O)_pCF_2X$, $X(CF_2)_3O(C_4F_8O)_p(CF_2)_3X$, wherein —X is —Q—$SiY_{3-x}R_x^1$ as defined above in Formula I or a nonsilane-containing terminal group as defined above (($C_nF_{2n+1}$)—, ($C_nF_{2n+1}$O)— or (X'$C_nF_{2n}$O)— wherein X' is H, Cl, or Br), with the proviso that at least one X group per molecule is a silane). Preferably, in each fluorinated polyether silane, Q contains a nitrogen or oxygen atom. More preferably, at least one X group per molecule is C(O)NH($CH_2$)$_3$Si(OR)$_3$ (wherein R is methyl, ethyl, polyethyleneoxy or mixtures thereof), and the other X group, if not a silane, is $OCF_3$, or $OC_3F_7$. The values of m and p in these approximate average structures can vary. Preferably, an average value of m is within a range of about 1 to about 50, and an average value of p is within a range of about 4 to about 40. As these are polymeric materials, such compounds exist as mixtures upon synthesis, which are suitable for use. These mixtures may also contain perfluoropolyether chains bearing no functional groups (inert fluids) or more than two terminal groups (branched structures) as a consequence of the methods used in their synthesis. Typically, mixtures of polymeric materials containing less than about 10% by weight of nonfunctionalized polymers (e.g., those without silane groups) can be used. Furthermore, mixtures of any of the individually listed compounds of Formula I can be used.

The compounds of Formula I can be synthesized using standard techniques. For example, commercially available or readily synthesized perfluoropolyether esters can be combined with a functionalized alkoxysilane, such as a 3-aminopropylalkoxysilane, according to U.S. Pat. No. 3,810, 874 (Mitsch et al.), incorporated herein by reference. Modifications of this method are described in the Examples. Such materials may or may not need to be purified before use in a treatment composition.

The composition comprising the fluorinated polyether silane of formula (I) is generally applied to the substrate in amounts sufficient to produce a coating which is water and oil repellent. This coating can be extremely thin, e.g. 1 to 50 molecular layers, though in practice a useful coating may be thicker.

Although the inventors do not wish to be bound by theory, compounds of the above Formula I are believed to undergo reaction with the substrate surface to form a siloxane layer. For the preparation of a durable coating, sufficient water should be present in order to cause hydrolysis of the silane end groups, and then condensation of the resulting silanol groups on and to the substrate. In this context, "siloxane" refers to Si—O—Si— bonds to which are attached polyfluoropolyether segments (such as the $R_f^1$ groups in Formula I herein), preferably, perfluoropolyether segments, bonded to the silicon atoms through organic linking groups (such as the Q groups in Formula I herein). In particularly preferred embodiments, the Q groups include nitrogen atoms (as in an amido group). A coating prepared from a coating composition that includes compounds of Formula I can also include unreacted or uncondensed silanol groups.

To achieve good durability, the compositions of the present invention include water. Typically, the amount of water will be between 0.1 and 20% by weight, preferably between 0.5% by weight and 15% by weight, more preferably between 1 and 10% by weight.

In addition to water, the compositions of the invention preferably include an organic or inorganic acid. Organic acids include acetic acid, citric acid, formic acid and the like; fluorinated organic acids, such as $CF_3SO_3H$, $C_3F_7COOH$, $C_7F_{15}COOH$, $C_6F_3P(O)(OH)_2$, or those which can be represented by the Formula II

(II)

wherein $R_f^2$ represents a mono or divalent polyfluoropolyether group, L represents an organic divalent linking group, Z represents an acid group, such as carboxylic acid group; m is 0 or 1 and n is 1 or 2.

Examples of suitable $R_f^2$ groups include those given above for $R^1_f$. Examples of organic acids of Formula II include $C_3F_7O(CF(CF_3)CF_2O)_{10-30}CF(CF_3)COOH$, commercially available from DuPont as 157 FSH, 157 FSL, and 157 FSM, or $CF_3(CF_2)_2OCF(CF_3)COOH$.

Examples of inorganic acids include sulphuric acid, hydrochloric acid, phosphoric acid, and the like. The acid will generally be included in the composition in an amount between about 0.005 and 10%, more preferably between 0.05 and 5% by weight.

A composition of the present invention includes one or more organic solvents. The organic solvent or blend of organic solvents used must be capable of dissolving at least 0.01% by weight of the fluorinated polyether silane of Formula I. Furthermore, the solvent or mixture of solvents must have a solubility for water of at least 0.1% by weight and a solubility for acid of at least 0.01% by weight. If the organic solvent or mixture of organic solvents do not meet these criteria, it may not be possible to obtain a homogeneous mixture of the fluorinated silane, solvent(s), water and acid. Although such non-homogeneous compositions could be used to treat a substrate, the coating obtained therefrom will generally not have the desired oil/water repellency and will not have sufficient durability properties.

Suitable organic solvents, or mixtures of solvents can be selected from aliphatic alcohols, such as methanol, ethanol, isopropyl alcohol; ketones such as acetone or methyl ethyl ketone; esters, such as ethyl acetate, methylformate and ethers, such as diisopropyl ether. Fluorinated solvents may be used in combination with the organic solvents in order to improve solubility of the fluorinated polyether silane. Such fluorinated solvents will generally not be suitable for use on their own because they will generally not meet the requirements of solubility for water and acid.

Examples of fluorinated solvents include fluorinated hydrocarbons, such as perfluorohexane or perfluorooctane, available from 3M; partially fluorinated hydrocarbons, such as pentafluorobutane, available from Solvay, or $CF_3CFHCFHCF_2CF_3$, available from DuPont; and hydrofluoroethers, such as methyl perfluorobutyl ether or ethyl perfluorobutyl ether, available from 3M. Various blends of these materials with organic solvents can be used.

The compositions may contain further components such as, for example, hydrocarbon silanes, i.e. silanes that are substantially non-fluorinated. However, the addition of hydrocarbon silanes is preferably kept below about 1% by weight, in order not to adversely affect the oil repellency properties of the composition.

Suitable substrates that can be treated in a particularly effective way with the fluorinated polyether silane mixture of this invention include substrates having a hard surface preferably with functional groups capable of reacting with the fluorinated silane according to formula (I). Preferably, such reactivity of the surface of the substrate is provided by active hydrogen atoms. When such active hydrogen atoms are not present, the substrate may first be treated in a plasma containing oxygen or in a corona atmosphere to make it reactive to the fluorinated polyether silane. Particularly preferred substrates include ceramics, glazed ceramics, glass, metal, natural and man-made stone, thermoplastic materials (such as poly(meth)acrylate, polycarbonate, polystyrene, styrene copolymers, such as styrene acrylonitrile copolymers, polyesters, polyethylene terephthalate), paints (such as those based on acrylic resins), powder coatings (such as polyurethane or hybrid powder coatings), and wood. Various articles can be effectively treated with the fluorochemical solution of the present invention to provide a water and oil repellent coating thereon. Examples include ceramic tiles, bathtubs or toilet pots, glass shower panels, construction glass, various parts of a vehicle (such as the mirror or windscreen), glass, and ceramic or enamel pottery materials.

Treatment of the substrates results in rendering the treated surfaces less retentive of soil and more readily cleanable due to the oil and water repellent nature of the treated surfaces. These desirable properties are maintained despite extended exposure or use and repeated cleanings because of the high degree of durability of the treated surface as can be obtained through the compositions of this invention.

Preferably, the substrate should be clean prior to applying the compositions of the invention so as to obtain optimum characteristics, particularly durability. That is, the surface of the substrate to be coated should be substantially free of organic contamination prior to coating. Cleaning techniques depend on the type of substrate and include, for example, a solvent washing step with an organic solvent, such as acetone or ethanol. The coating composition is typically a relatively diluted solution, containing between 0.01 and 5 percent by weight inclusive of the fluorinated silane, more preferably, between 0.03 and 3 percent by weight inclusive of the fluorinated silane, and most preferably, between 0.05 and 0.2 percent by weight inclusive of the fluorinated polyether silane. The ratio of the solvents, water and acid should be chosen so as to obtain a homogeneous mixture.

For ease of manufacturing and for reasons of cost, the compositions of the present invention will generally be prepared shortly before use by diluting a concentrate of the fluorinated polyether silane of formula (I). The concentrate will generally comprise a concentrated solution of the fluorinated polyether silane of formula (I) in an organic solvent without water and/or acid being present in such concentrate. The concentrate should be stable for several weeks, preferably at least 1 month, more preferably at least 3 months. It has been found that the fluorinated polyether silane of formula (I) can be readily dissolved in an organic solvent at high concentrations. Fluorinated polyethers of molecular weight lower than about 1000 give clear solutions in many organic solvents such as alcohols, ketones, and esters over a wide range of concentrations. For fluorinated polyethers of molecular weight higher than about 1,500, a surprising solubility effect has been found. Particularly, it was found that at amounts of at least 25% by weight, it becomes easier to dissolve the fluorinated polyether silane (I) in an organic solvent and obtain concentrated solutions that are generally clear and stable over a long period. This is surprising as only turbid solutions of limited stability may be obtained at low concentration, whereas at high concentration in the same organic solvent, clear solutions with high stability are obtained. For example, at room temperature, stable clear solutions of these higher molecular weight materials can be obtained in ketones ) (e.g., acetone, methyl ethyl ketone, and methyl isobutyl ketone), esters (e.g., ethyl acetate), and alcohols (e.g., ethanol, methanol, and isopropanol) at a concentration of at least 25% by weight of the fluorinated polyether silane (I), whereas at a concentration of only 0.1% in non-halogenated organic solvents, the solution tends to be hazy and of limited stability. In ethanol, it was found that clear stable solutions were formed at concentrations of at least 40% by weight whereas at 0.1% by weight, the solution was hazy. On the other hand in highly fluorinated solvents, such as hydrofluoroethers, hydrofluorocarbons, or perfluorocarbons, solutions containing 0.1% or more of the fluorinated polyether silane, are clear.

Thus, in accordance with a preferred embodiment, compositions for application to a substrate are prepared by diluting a concentrate comprising a solution of at least 25% by weight of a fluorinated polyether silane according to Formula I in an organic solvent, by adding to the concentrate an organic solvent or mixture of solvents, water, and an organic acid. A thus freshly prepared diluted solution will generally be stable for 1 or more days. It has further been found that conditioning the composition at room temperature for 1 to 3 days may further improve the abrasion resistance of a coating prepared from such a conditioned solution.

A wide variety of coating methods can be used to apply a composition of the present invention, such as brushing, spraying, dipping, rolling, spreading, and the like. A preferred coating method for application of a fluorinated polyether silane mixture of the present invention includes spray application. A substrate to be coated can typically be contacted with the treating composition at room temperature (typically, about 20° C. to about 25° C.). Alternatively, the mixture can be applied to substrates that are preheated at a temperature of for example between 60° C. and 150° C. This is of particular interest for industrial production, where eg. ceramic tiles can be treated immediately after the baking oven at the end of the production line. Following application, the treated substrate can be dried and cured at ambient or elevated temperature, e.g. at 40° to 300° C. and for a time sufficient to dry. The process may also require a polishing step to remove excess material.

EXAMPLES

The following examples further illustrate the invention without the intention however to limit the invention thereto. All parts are by weight unless indicated otherwise.
Abbreviations AcA: acetic acid, available from Aldrich DBTDA: dibutyltindiacetate, available from Aldrich ODTS: octadecyltrimethoxysilane, available from ABCR, Germany MPEG 350: poly(ethyleneglycol)monomethyl ether, available from Aldrich Krytox™ 157FSL: perfluoropolyether carboxylic acid, available from DuPont HFE-7100™: methyl perfluorobutylether, available from 3M HFC-365: 1,1,1,3,3-pentafluorobutane, available from Solvay Synthesis of Fluorinated Polyether Silanes
A. Perfluoropolyetherdisilanes PFPES-1 and PFPES-2

PFPES-1 and PFPES-2 were prepared by reacting perfluoropolyetherdiester $CH_3OC(O)CF_2(CF_2O)_{9-11}(CF_2CF_2O)_{9-11}CF_2C(O)OCH_3$ (with average molecular weight of about 2000), commercially available from Ausimont, Italy, under the trade designation Fomblin™ Z-DEAL, with respectively 3-aminopropyltrimethoxysilane and 3-aminopropyltriethoxysilane, available from Aldrich Company Co., as taught in U.S. Pat. No. 3,810,874 (Mitsch et al.), table 1, line 6. The exothermic reactions proceeded readily at room temperature, simply by mixing the starting materials. The progress of the reaction was monitored by infrared analysis.

B. Perfluoropolyether Diurethanedisilane PFPES-3

PFPES-3 was obtained by reacting perfluoropolyetherdihydrodiol FC-2202 (average molecular weight of about 1800, compound XVII in U.S. Pat. No. 3,810,874), commercially available from 3M., with two equivalents of 3-trimethoxysilylpropylisocyanate (available from Aldrich) in ethylacetate, at 80° C. under nitrogen atmosphere during 16 hours, in the presence of dibutyltindilaurate catalyst. After the reaction was completed, as indicated by IR-analysis, the solvent was evaporated.

C. Perfluoropolyether Dietherdisilane PFPES4

PFPES-4 was prepared according to the method as described in U.S. Pat. No. 3,810,874, example X, but using FC-2202 and 3-chloropropyltrimethoxysilane as reagents.

D. Hexafluoropropyleneoxide Diurethanedisilane PFPES-5

PFPES-5 was prepared by reacting a perfluoropolyetherdiol $(HOCH_2CF(CF_3)O(CF(CF_3)CF_2O)_{6-7}(CF_2)_4O(CF(CF_3)CF_2O)_{6-7}CF(CF_3)CH_2OH$ (with average molecular weight of about 1300) with two equivalents of 3-trimethoxysilylpropylisocyanate in ethylacetate, at 80° C. during 16 hours under nitrogen atmosphere and in the presence of dibutyltindilaurate. After the reaction was completed, as indicated by IR-analysis, the ethylacetate was evaporated.

E. Hydrolyzable Perfluoropolyether Disilane/MPEG 350 Adduct PFPES-6

PFPES-6 was prepared according to the procedure described in U.S. Pat. No. 5,274,159, example 8.
Substrates The fluorinated polyether silane mixtures according to the invention were tested on various substrates as given in the table below:

| Substrate | Supplier |
|---|---|
| White glazed wall tiles | Villeroy and Boch, Germany |
| White glazed wall tiles | Toprak, Turkey |
| White glazed wall tiles | Ideal Standard, Germany |
| Glass | Pilkington, UK |
| Polyethyleneterephtalate (PET)sheet | NUDEC, Spain |
| Polystyrene (PS) sheet | NUDEC, Spain |
| Polymethylmethacrylate (PMMA) sheet | NUDEC, Spain |
| Styrene acrylonitrile (SAN) sheet | NUDEC, Spain |
| Cupper (Cu) plate | Enthone-OMI, Germany |
| Linoleum | Forbo-Krommerie, Netherlands |
| Enamel plate | ROCA, Spain |
| Polyurethane (PU) powder coating | Ruhr Pulverlack GmbH, Germany |
| Epoxy powder coating | Ruhr Pulverlack GmbH, Germany |
| Aluminium (Al) foil | Enthone-OMI, Germany |
| Wood | BRICO, Belgium |
| Acrylic paint | ICI, UK |
| Chromated steel | Ideal Standard, Germany |
| Galvanised steel | Enthone-OMI, Germany |

Solvents

Following solvents were used in the examples and comparative examples. The solvent(s) can be selected to already contain the desired amount of water, or the desired amount of water can be added separately.

| Solvent | Abbreviation | % water in solvent |
|---|---|---|
| Diisopropylether | DIPE | 0.3 |
| Methylethylketone | MEK | 0.5 |
| t-butylmethylether | tBME | 0.1 |
| Ethanol (technical grade) | EtOH | 5 |
| Absolute ethanol | Absolute EtOH | <0.1 |
| t-butanol | tBuOH | 0.2 |
| Methyl perfluorobutylether | HFE-7100 | 0 |
| 1,1,1,3,3-pentafluorobutane | HFC-365 | 0 |

Methods of Application and Testing

Coating Method

In a first step, the substrates were cleaned and degreased with acetone. After cleaning, fluorinated polyether silanes in solvent mixtures as given in the respective examples were applied onto the substrates, by spray application at about 20 ml/minute. The substrates were kept at room temperature before coating. Alternatively, the substrates were preheated before coating. Coated samples were dried at room temperature or forced-air oven dried at 120° C. for 30 minutes. Afterwards, excess product was polished off using a dry paper cloth.

Contact Angles

The treated substrates were tested for their contact angles versus water (W) and n-hexadecane (O) using an Olympus TGHM goniometer. The contact angles were measured before (initial) and directly after abrasion (abrasion), unless otherwise indicated. The values are the mean values of 4 measurements and are reported in degrees. The minimum measurable value for a contact angle was 20°. A value <20° meant that the liquid spread on the surface.

Abrasion Test

The treated substrates were abraded using an AATCC Crockmeter, using sandpaper nr. 600 grit (available from 3M). Alternatively, abrasion testing was accomplished using an Erichsen cleaning machine, 3M High Performance Cloth (available from 3M) and CIF cleaner (available from Lever), using 40 cycles.

EXAMPLES

Examples 1 to 14 and Comparative Examples C-1 to C-4

In examples 1 to 14, mixtures were made of 0.1% PFPES-1 according to the invention. In examples 1 to 6, no additional water was added to the mixture, since the organic solvents used already contained water, as given in the table of solvents. Examples 9 and 10 formed a slightly hazy mixture, all the other mixtures were clear.

Comparative examples C-1 to C-4 were made by mixing 0.1% PFPES-1 in solvent mixtures, without the use of water and/or acid. The composition of each mixture is given in Table 1. The 0.1% mixtures of the examples and the comparative examples were spray applied onto white glazed wall tiles (Villeroy and Boch), stored at room temperature. The treated wall tiles were heated at 120° C. for 30 minutes, followed by polishing. Contact angles were measured before and after abrasion with the Erichsen cleaning machine. The results are given in Table 1.

TABLE 1

Contact angles of wall tiles treated with fluorinated polyether silane mixtures.

| | | Contact angles (°) | | | |
|---|---|---|---|---|---|
| Ex | Solvent Mixture | Initial Water | Initial Hexa-decane | After abrasion Water | After abrasion Hexadecane |
| 1 | DLPE/AcA 97/3 | 101 | 67 | 80 | 47 |
| 2 | HFC-365/MEK/AcA 24.3/72.8/2.9 | 97 | 60 | 80 | 51 |
| 3 | TBME/AcA 97/3 | 97 | 60 | 82 | 48 |
| 4 | HFC-365/acetone/AcA 24.3/72.8/2.9 | 100 | 60 | 82 | 52 |
| 5 | HFC-365/EtOH/AcA 24.3/72.8/2.9 | 96 | 58 | 80 | 50 |
| 6 | HFE-7100/tBuOH/AcA 24.3/72.8/2.9 | 99 | 60 | 80 | 48 |
| 7 | HFC-365/acetone/AcA/$H_2O$ 28.8/67.3/1/2.9 | 104 | 63 | 92 | 58 |
| 8 | HFC-365/EtOH/AcA/$H_2O$ 28.8/67.3/1/2.9 | 100 | 60 | 88 | 56 |
| 9 | HFC-365/EtOH/AcA/$H_2O$ 35.4/53.1/2.7/8.8 | 99 | 62 | 90 | 55 |
| 10 | HFC-365/EtOH/AcA/$H_2O$ 37/55.6/2.8/4.6 | 103 | 62 | 90 | 58 |
| 11 | HFC-365/EtOH/citric acid/$H_2O$ 38.5/57.7/0.9/2.9 | 104 | 65 | 88 | 59 |
| 12 | HFE-7100/EtOH/Krytox ™/$H_2O$ 40/57/0.05/3 | 100 | 63 | 80 | 54 |
| 13 | EtOH/$H_2SO_4$/$H_2O$ 96/1/3 | 104 | 62 | 84 | 57 |
| 14 | HFE-7100/EtOH/AcA/$H_2O$ 40/55.5/1.5/3 | 101 | 62 | 104 | 60 |
| C-1 | HFE-7100 100 | 100 | 60 | 70 | 45 |
| C-2 | HFE-7100/DBTDA 99.9/0.1 | 93 | 60 | 62 | 40 |
| C-3 | HFE-7100/AcA 99/1 | 95 | 58 | 77 | 46 |
| C-4 | HFC-365 100 | 105 | 64 | 63 | 42 |

The results indicated that tiles with high oil and water repellency could be made by using fluorinated polyether silane mixtures comprising water and acid, according to the invention. High contact angles were measured, especially after abrasion, indicating that highly durable coatings were made. Organic acids, fluorinated acids, as well as inorganic acids could be used. In order to obtain the best results the solvent system needed to be balanced. Water and acid could be present in the formulations at certain levels as long as stable and homogeneous mixtures were obtained without a phase split or fast sedimentation, prior to application.

Examples 15 to 29

In examples 15 to 29, different substrates, which were kept at room temperature, were treated with a mixture of HFC-365/EtOH/$H_2O$/AcA (38.3/57.4/1.4/2.9), containing 0.1% of fluorinated polyether silanes as given in Table 2. The treated substrates were heated at 80° C. for 30 minutes and then polished. The samples were abraded using the AATCC Crockmeter with sandpaper nr. 600. Contact angles were measured before and after abrasion. The results are given in Table 2.

TABLE 2

Contact angles of substrates treated with fluorinated polyether silane.

Contact angles (°)

| Ex No | Substrate | Untreated W/O Initial | PFPES-1 W/O Initial | PFPES-1 W/O Abrasion | PFPES-3 W/O Initial | PFPES-3 W/O Abrasion | PFPES-5 W/O Initial | PFPES-5 W/O Abrasion |
|---|---|---|---|---|---|---|---|---|
| 15 | Glass | 35/20 | 95/58 | 92/52 | 95/58 | 88/53 | 94/52 | 83/50 |
| 16 | PET | 75/<20 | 93/62 | 95/43 | 93/64 | 84/55 | 93/59 | 82/49 |
| 17 | PS | 78/<20 | 88/62 | 75/42 | 85/61 | 83/45 | 88/52 | 76/44 |
| 18 | PMMA | 72/<20 | 90/60 | 75/42 | 89/58 | 90/45 | 88/50 | 80/40 |
| 19 | SAN | 75/<20 | 97/64 | 75/40 | 88/55 | 83/40 | 88/52 | 77/38 |
| 20 | Cu | 32/<20 | 98/66 | 90/63 | 95/58 | 85/55 | 93/55 | 80/50 |
| 21 | Linoleum | 95/<20 | 121/63 | 115/60 | 126/60 | 93/53 | 120/58 | 108/52 |
| 22 | Enamel | 40/<20 | 93/64 | 96/65 | 90/53 | 79/50 | 88/56 | 77/50 |
| 23 | PU | 75/<20 | 95/64 | 95/63 | 93/60 | 95/50 | 85/58 | 82/40 |
| 24 | Epoxy | 65/<20 | 95/62 | 92/58 | 87/55 | 77/45 | 83/55 | 72/40 |
| 25 | Aluminium | 55/<20 | 92/60 | 87/62 | 92/57 | 85/52 | 94/57 | 89/50 |
| 26 | Wood | <20/<20 | 132/52 | 62/38 | 126/62 | 75/40 | 105/55 | 74/42 |
| 27 | Acrylic | 51/<20 | 95/64 | 93/45 | | | | |
| 28 | Chromated Steel | 72/<20 | 98/62 | 85/45 | | | | |
| 29 | Galvanized Steel | 66/<20 | 90/60 | 82/39 | | | | |

The results in Table 2 show that the application of a 0.1% mixture of fluorinated polyether silane, according to the invention, improved the water and oil repellency of the different substrates considerably. After abrasion testing was done, the contact angles for water and n-hexadecane remained about the same, indicating high durability of the treatment.

Examples 30 to 40

In examples 30 to 40 the same experiment was done as for examples 15 to 29, but with fluorinated polyether silanes PFPES-2 and PFPES-4. The results are given in 3.

TABLE 3

Contact angles of substrates treated with fluorinated polyether silane.

Contact angles (°)

| Ex No | Substrate | Untreated W/O Initial | PFPES-2 W/O Initial | PFPES-2 W/O Abrasion | PFPES-4 W/O Initial | PFPES-4 W/O Abrasion |
|---|---|---|---|---|---|---|
| 30 | Glass | 35/20 | 95/55 | 88/50 | 75/48 | 67/45 |
| 31 | PET | 75/<20 | | | 95/59 | 80/50 |
| 32 | PS | 78/<20 | | | 85/57 | 80/42 |
| 33 | PMMA | 72/<20 | | | 95/44 | 83/40 |
| 34 | SAN | 75/<20 | | | 96/60 | 80/37 |
| 35 | Linoleum | 95/<20 | 116/60 | 100/52 | 100/55 | 80/45 |
| 36 | Enamel | 40/<20 | 92/62 | 80/52 | 90/53 | 76/60 |
| 37 | PU | 75/<20 | | | 85/55 | 77/45 |
| 38 | Epoxy | 65/<20 | | | 85/55 | 70/35 |
| 39 | Aluminium | 55/<20 | | | 86/55 | 73/45 |
| 40 | Wood | <20/<20 | 120/61 | 71/46 | 93/50 | 77/25 |

The results in Table 3 show that the application of a 0.1% mixtures of fluorinated polyether silane, according to the invention, improved the water and oil repellency of the different substrates. In most cases and depending on the type of fluorinated polyether silane used, high durability of the treatment was observed.

Examples 41 and 42 and Comparative Examples C-5 and C-6

In examples 41 and 42 tiles from Villeroy and Boch, kept at room temperature were treated with 0.1% PFPES-1 in mixtures as given in able 3. Example 42 additionally contained 1% of a hydrocarbon silane ODTS. Comparative example C-5 was made with a mixture of 2% FC405, a fluorochemical silane, available from 3M, and comparative example C-6 was made with 0.1% PFPES-1 in HFE-7100, without the addition of water or acid. The samples were air dried at room temperature, no heat curing was applied. After drying, the samples were polished and abraded using the Erichsen cleaning machine. The contact angles for water and n-hexadecane were measured before and after abrasion. The results are given in Table 4.

TABLE 4

Contact angles of treated tiles - no heat treatment.

Contact angles (°)

| Ex | Solvent mixture | Initial Water | Initial Hexa-decane | After abrasion Water | After abrasion Hexadecane |
|---|---|---|---|---|---|
| 41 | HFC-365/EtOH/AcA/H$_2$O 38.3/57.4/1.4/2.9 | 90 | 58 | 74 | 42 |
| 42 | HFC-365/EtOH/AcA/H$_2$O/ODTS 38.2/57.4/1.4/2.9/0.1 | 89 | 55 | 80 | 39 |
| C-5 | EtOH/AcA/H$_2$O 83.3/2.9/9.8 | 92 | 55 | 51 | 25 |
| C-6 | HFE-7100 100 | 90 | 50 | 53 | 39 |

The data showed that tiles with high water and oil repellency could be obtained when they were treated with the fluorinated polyether silane compositions of the present invention. The values remained high after abrasion. This indicated that durable coatings were made, even in the absence of a heat cure. This makes the compositions economically very attractive. To the contrary, tiles treated with the comparative compositions showed poor oil and water repellency after abrasion, indicative of a less durable coating. The addition of a hydrocarbon silane to the fluorinated polyether silane mixture did not harm the water or oil repellency and a durable coating was obtained. However, care should be taken not to add too much hydrocarbon silane, in order not to decrease the oil repellency of the treated substrate.

Examples 43 to 49

Examples 43 to 49 were made to evaluate the influence of the amount of water in the treatment compositions according to the invention. The composition of the mixtures is given in Table 5. The ethanol used in examples 48 and 49 was absolute ethanol, containing <0.1% water. The mixtures were applied by spraying to tiles from Toprak, Turkey, kept at room temperature. The treated tiles were cured at 120° C. for 30 min. After they were cooled to room temperature, the tiles were polished and abraded using an Erichsen abrader tester. The contact angles were measured before and after abrasion. The results are given in Table 5.

TABLE 5

Contact angles of tiles treated with fluorinated polyether silane mixtures.

| | | Contact angles (°) | | |
|---|---|---|---|---|
| Ex | Treatment mixture | Initial Water | Initial Hexa-decane | After abrasion Water | After abrasion Hexadecane |
| 43 | PFPES-1/EtOH/AcA/H$_2$O 0.1/96.8/3/0.1 | 99 | 62 | 92 | 58 |
| 44 | PFPES-1/EtOH/AcA/H$_2$O 0.1/95.9/3/1 | 90 | 60 | 95 | 62 |
| 45 | PFPES-1/EtOH/AcA/H$_2$O 0.1/93.9/3/3 | 100 | 68 | 88 | 52 |
| 46 | PFPES-1/EtOH/AcA/H$_2$O 0.1/86.9/3/10 | 102 | 64 | 90 | 60 |
| 47 | PFPES-1/acetone/AcA/H$_2$O 0.1/95.5/1.5/3 | 108 | 67 | 93 | 58 |
| 48 | PFPES-1/absolute EtOH/AcA/H$_2$O 0.1/96.8/3/0.1 | 95 | 55 | 80 | 50 |
| 49 | PFPES-1/absolute EtOH/AcA/H$_2$O 0.1/95.9/3/1 | 95 | 58 | 92 | 56 |

The data indicated that compositions comprising fluorinated polyether silanes, solvent, acid and water provided tiles treated therewith with high oil and water repellency properties. Even small amounts of water added to the compositions were sufficient. (See examples 48 and 49.) Abrasion did not decrease the contact angles considerably, indicating that durable coatings were formed.

Example 50

Example 50 was made in order to evaluate aging conditions. A slightly hazy mixture of 0.1% PFPES-1 in EtOH/AcA/H$_2$O 95.5/1.5/3 was sprayed on tiles from Torpak, which were preheated at 120° C. The sprayed tiles were allowed to cool down to 40° C., after which they were polished. No heat cure was applied. The performance of the tiles was evaluated immediately by measuring contact angles before and after abrasion with an Erichsen abrasion tester. Other tiles of the same series were left at room temperature for 72 hours. The contact angles were measured. The tiles were abraded and the contact angles were measured after 24 hours. The results as given in Table 6 are the mean values of the results of 4 treated tiles.

TABLE 6

Contact angles of warm tiles, treated with fluorinated polyether silane mixture before and after aging.

| | Contact angles (°) immediately | | Contact angles (° C.) 72 hrs aging | |
|---|---|---|---|---|
| Ex | Initial W/O | After abrasion W/O | Initial W/O | 24 hrs after abrasion W/0 |
| 50 | 94/56 | 90/56 | 102/65 | 95/60 |

From the data, it could be seen that the oil and water repellency of the treated tiles increased with aging. The abrasion had no effect on the properties of the treated tiles, indicating that a very durable coating was formed.

Examples 51–54

Examples 51 through 54 were made to evaluate the influence of aging of a fluorinated polyether silane mixture before application to a substrate. A slightly hazy mixture of 0.1% PFPES-1 in EtOH/AcA/H$_2$O 95.5/1.5/3 was prepared. In example 51, a freshly prepared mixture was sprayed on tiles from Villeroy & Boch, Germany, preheated in a 120° C. oven until the surface of the substrate reached about 85° C. In example 52, the mixture was kept at room temperature for 24 hours before spraying it onto the tiles. The sprayed tiles were allowed to cool down to 40° C., after which they were polished. No heat cure was applied. The performance of the tiles was evaluated immediately after polishing. The samples were abraded using an Erichsen abrader tester and the contact angles were measured 24 hours after abrasion. In examples 53 and 54, essentially the same procedure was followed as in example 52, except that the mixture was kept at room temperature for 48 hours in example 53 and 72 hours in example 54 prior to application to the tiles. The results as given in Table 7 are the mean values of the results of 4 treated tiles.

TABLE 7

Performance of tiles treated with an aged mixture comprising fluorinated polyether silane.

| | | Contact angles (°) | | | |
|---|---|---|---|---|---|
| Ex | Treatment | Initial Water | Initial hexa-decane | 24 hrs after abrasion Water | 24 hrs after abrasion hexadecane |
| 51 | Fresh mixture, no aging | 100 | 58 | 86 | 53 |
| 52 | 24 hrs aging before application | 103 | 60 | 82 | 50 |
| 53 | 48 hrs aging before application | 104 | 60 | 80 | 52 |
| 54 | 72 hrs aging before application | 106 | 65 | 80 | 52 |

From the data, it could be seen that an increase in performance of the treated samples could be obtained when the hazy mixture was kept at room temperature before application to the tiles. The initial values were boosted dramatically. Furthermore, abrasion did not seem to have an influence on the performance, confirming the formation of a durable coating.

Example 55

In example 55 a mixture was prepared of EtOH/AcA/H$_2$O/PFPES-6 95.3/1.5/3/0.2. This mixture was sprayed on tiles from Villeroy and Boch, which were preheated in a 120° C. oven until the surface of the substrate reached about 85° C. Hydrophilic residuals (MPEG 350) were removed by cleaning the surface with a mixture of water/acetic acid 97/3. The treated tiles were oven cured at 120° C. during 15 min. The results of contact angles are given in Table 8.

TABLE 8

Contact angles of wall tiles treated with fluorinated polyether silane PFPES-6

| | Contact angles (°) | | | |
|---|---|---|---|---|
| Ex | Initial Water | Initial hexadecane | After abrasion Water | After abrasion hexadecane |
| 55 | 95 | 59 | 85 | 52 |

The results indicated that a durable oil and water repellent coating was obtained.

What is claimed is:

1. Composition for treating a substrate comprising a homogeneous mixture of:
   (a) a fluorinated polyether silane of the formula:

wherein $R_f^1$ represents a monovalent or divalent polyfluoropolyether group, Q represents an organic divalent linking group, $R^1$ represents a $C_1$–$C_4$ alkyl group, Y represents a hydrolysable group; x is 0 or 1 and y is 1 or 2;
   (b) an acid corresponding to the formula:

wherein $R_f^2$ represents a mono or divalent polyfluoropolyether group, L represents an organic divalent linking group, Z represents an acid group, m is 0 or 1 and n is 1 or 2;
   (c) water and
   (d) an organic solvent.

2. Composition according to claim 1 wherein said organic solvent has a solubility for water of at least 0.1% by weight at ambient temperature and a solubility for said fluorinated polyether silane at ambient temperature of at least 0.01% by weight.

3. Composition according to claim 1 wherein Z represents a carboxylic acid group.

4. Composition of claim 1 wherein the amount of said fluorinated polyether silane is between 0.01 and 5% by weight, the amount of said organic or inorganic acid is between 0.01 and 5% by weight and the amount of water is between 0.1 and 15% by weight.

5. Composition of claim 1 wherein said organic solvent comprises a solvent selected from the group of ethanol, acetone, methyl ethyl ketone and isopropanol.

6. Composition according to claim 5 wherein said organic solvent further comprises a fluorinated solvent.

7. Method for treating a substrate comprising the step of applying a composition according to claim 1 to said substrate.

8. Method according to claim 7 wherein said substrate is a ceramic substrate.

9. Method according to claim 7 wherein said method further comprises curing the applied composition at elevated temperature.

10. Method according to claim 9 wherein said substrate is heated prior to application of said composition so as to cause curing of said composition when said composition is applied.

11. Method according to claim 9 wherein subsequent to or simultaneous with the application of said composition, the composition is heated to cure the composition.

12. Method according to claim 9 wherein said elevated temperature is between 40 and 300° C.

13. Method for making a composition for the treatment of a substrate, said method comprising diluting a solution of at least 25% by weight of a fluorinated polyether silane a of the formula:

wherein $R_f^1$ represents a monovalent or divalent polyfluoropolyether group, Q represents an organic divalent linking group, $R^1$ represents a $C_1$–$C_4$ alkyl group, Y represents a hydrolysable group; x is 0 or 1 and y is 1 or 2, in an organic solvent by adding to said solution an organic solvent, water and an organic or inorganic acid so as to prepare a homogeneous mixture containing between 0.01 and 5% by weight of said fluorinated polyether silane.

* * * * *

UNITED STATES PATENT AND TRADEMARK OFFICE
CERTIFICATE OF CORRECTION

PATENT NO. : 6,613,860 B1
DATED : September 2, 2003
INVENTOR(S) : Dams, Rudolf J.

It is certified that error appears in the above-identified patent and that said Letters Patent is hereby corrected as shown below:

Column 3,
Line 28, delete "I" and insert in place thereof -- 1 --

Column 4,
Line 57, delete "Si—O—Si—" and insert in place thereof -- —Si—O—Si --

Column 5,
Line 17, delete "$R^1_f$" and insert in place thereof -- $R_f^1$ --
Line 31, delete "0. 1%" and insert in place thereof -- 0.1% --

Column 8,
Line 39, delete "Polyetheneterphtalate" and insert in place thereof
-- Polyetheneterephalate --
Line 53, delete "Cupper" and insert in place thereof -- Copper --

Column 10,
Line 11, delete "DLPE" and insert in place thereof -- DIPE --

Column 11,
Line 40, delete "in 3" and insert in place therefor -- in Table 3 --

Column 12,
Line 31, delete "able" and insert in place thereof -- Table --

Column 13,
Line 57, delete "Torpak" and insert in place thereof -- Toprak --

Column 14,
Line 8, delete "W/0" and insert in place thereof -- W/O --

UNITED STATES PATENT AND TRADEMARK OFFICE
CERTIFICATE OF CORRECTION

PATENT NO. : 6,613,860 B1
DATED : September 2, 2003
INVENTOR(S) : Dams, Rudolf J.

It is certified that error appears in the above-identified patent and that said Letters Patent is hereby corrected as shown below:

Column 16,
Line 33, delete "silane a of the" and insert in place thereof -- silane of the --

Signed and Sealed this

Nineteenth Day of October, 2004

JON W. DUDAS
*Director of the United States Patent and Trademark Office*